(12) United States Patent
Pollish, Jr.

(10) Patent No.: US 6,679,349 B1
(45) Date of Patent: Jan. 20, 2004

(54) FORK LIFT APPARATUS

(76) Inventor: Robert W. Pollish, Jr., 302 Dundaff St., Carbondale, PA (US) 18407

( * ) Notice: Subject to any disclaimer, the term of this patent is extended or adjusted under 35 U.S.C. 154(b) by 0 days.

(21) Appl. No.: 10/077,781

(22) Filed: Feb. 20, 2002

(51) Int. Cl.[7] .............................................. B60K 26/00
(52) U.S. Cl. .................................. 180/326; 297/344.23
(58) Field of Search ................................ 180/326, 329, 180/330, 315, 321, 39.13; 297/344.23

(56) References Cited

U.S. PATENT DOCUMENTS

| | | | |
|---|---|---|---|
| 1,512,803 A | * 10/1924 | Robinson et al. | 180/75 |
| 2,384,890 A | * 9/1945 | Coldwell | 180/329 |
| 3,693,744 A | * 9/1972 | Horn et al. | 180/53.1 |
| 4,450,927 A | * 5/1984 | Hirata et al. | 180/330 |
| 5,052,512 A | * 10/1991 | Pakosh et al. | 180/329 |
| 6,390,764 B1 | * 5/2002 | Merlo et al. | 414/680 |

* cited by examiner

Primary Examiner—Paul N. Dickson
Assistant Examiner—Faye M. Fleming

(57) ABSTRACT

A fork lift apparatus for allowing a user to easily move from one steering mechanism to the other steering mechanism. The fork lift apparatus includes a conventional fork lift chassis including a frame being mounted upon a wheel assembly including axle members and wheel members; and also includes a conventional drive assembly being mounted to the conventional fork lift chassis and including a pair of steering mechanisms being functionally positioned at opposite ends of the conventional fork lift chassis and also including a pair of foot pedals being functionally positioned at the opposite ends of the conventional fork lift chassis and further including conventional control levers being mounted to the steering mechanisms for driving the fork lift apparatus; and further includes a conventional lift assembly being movably mounted upon one of the ends of the conventional fork lift chassis for lifting objects; and also includes a positionable seat assembly being mounted upon the conventional fork lift chassis for movement between the steering mechanisms.

4 Claims, 4 Drawing Sheets

FORK LIFT APPARATUS

BACKGROUND OF THE INVENTION

1. Field of the Invention

The present invention relates to dual steering fork lifts and more particularly pertains to a new fork lift apparatus for allowing a user to easily move from one steering mechanism to the other steering mechanism.

2. Description of the Prior Art

The use of dual steering fork lifts is known in the prior art. More specifically, dual steering fork lifts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,693,744; U.S. Pat. No. 4,548,291; U.S. Pat. No. 4,790,711; U.S. Pat. No. 3,874,539; U.S. Pat. No. 4,287,966; U.S. Pat. No. 5,520,258; U.S. Pat. No. 5,890,562; and U.S. Pat. No. Des. 389,981.

While these devices fulfill their respective, particular objectives and requirements, the aforementioned patents do not disclose a new fork lift apparatus. The prior art includes inventions having a chassis, dual steering mechanisms, and also a lift assembly mounted to the chassis.

SUMMARY OF THE INVENTION

The general purpose of the present invention, which will be described subsequently in greater detail, is to provide a new fork lift apparatus which has many of the advantages of the dual steering fork lifts mentioned heretofore and many novel features that result in a new fork lift apparatus which is not anticipated, rendered obvious, suggested, or even implied by any of the prior art dual steering fork lifts, either alone or in any combination thereof. The present invention includes a conventional fork lift chassis including a frame being mounted upon a wheel assembly including axle members and wheel members; and also includes a conventional drive assembly being mounted to the conventional fork lift chassis and including a pair of steering mechanisms being functionally positioned at opposite ends of the conventional fork lift chassis and also including a pair of foot pedals being functionally positioned at the opposite ends of the conventional fork lift chassis and further including conventional control levers being mounted to the steering mechanisms for driving the fork lift apparatus; and further includes a conventional lift assembly being movably mounted upon one of the ends of the conventional fork lift chassis for lifting objects; and also includes a positionable seat assembly being mounted upon the conventional fork lift chassis for movement between the steering mechanisms. None of the prior art includes a seat member which can be easily moved back and forth from one steering mechanism to the other steering mechanism.

There has thus been outlined, rather broadly, the more important features of the fork lift apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new fork lift apparatus which has many of the advantages of the dual steering fork lifts mentioned heretofore and many novel features that result in a new fork lift apparatus which is not anticipated, rendered obvious, suggested, or even implied by any of the prior art dual steering fork lifts, either alone or in any combination thereof.

Still another object of the present invention is to provide a new fork lift apparatus for allowing a user to easily move from one steering mechanism to the other steering mechanism.

Still yet another object of the present invention is to provide a new fork lift apparatus that is convenient for the user to easily move from one steering mechanism to the other.

Even still another object of the present invention is to provide a new fork lift apparatus that allows the user to always see where one's going by allowing the user to face the direction of movement of the fork lift apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
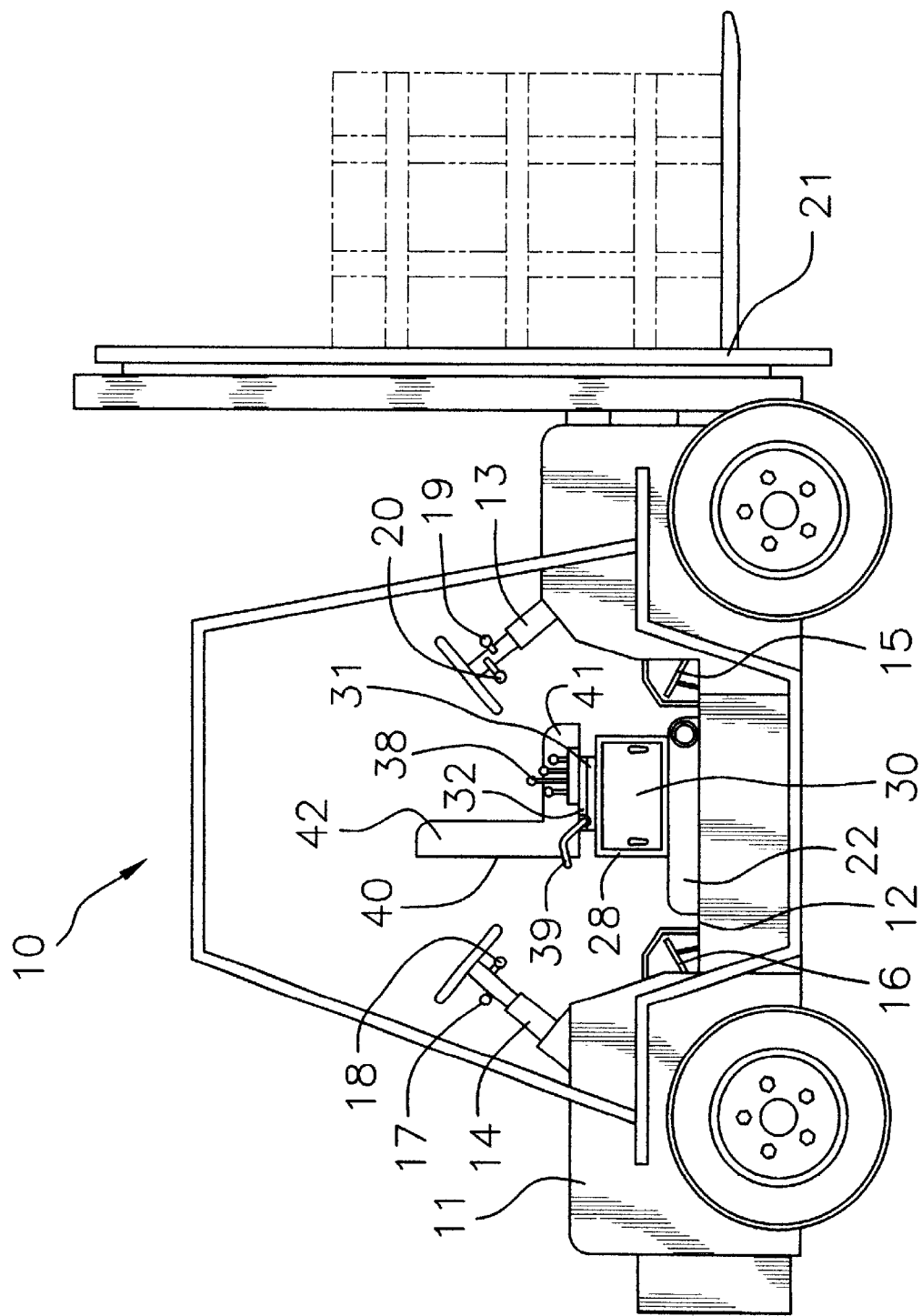
FIG. 1 is a side elevational view of a new fork lift apparatus according to the present invention and shown in use.
Figure 2:
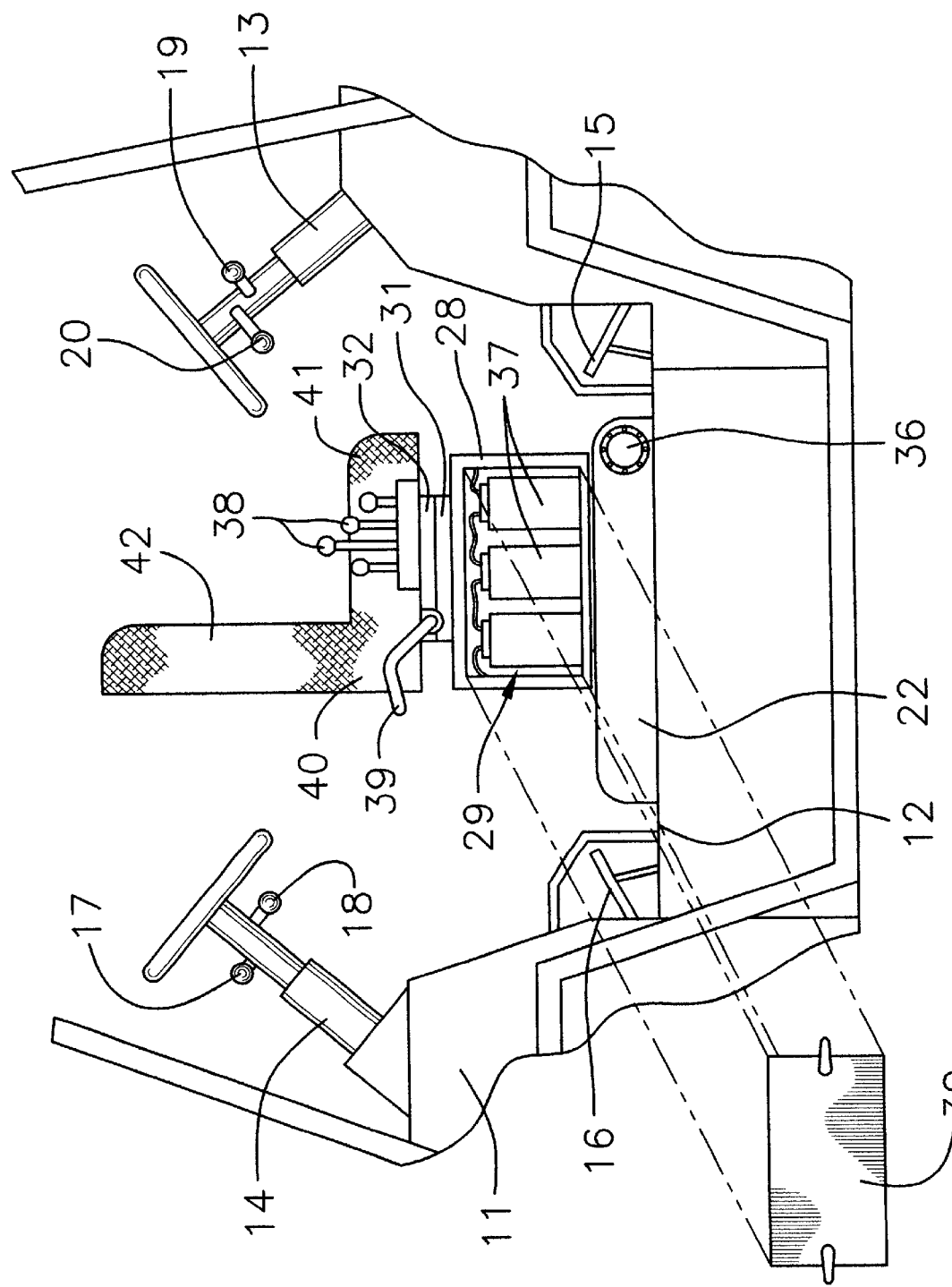
FIG. 2 is a detailed side elevational view of the present invention.
Figure 3:
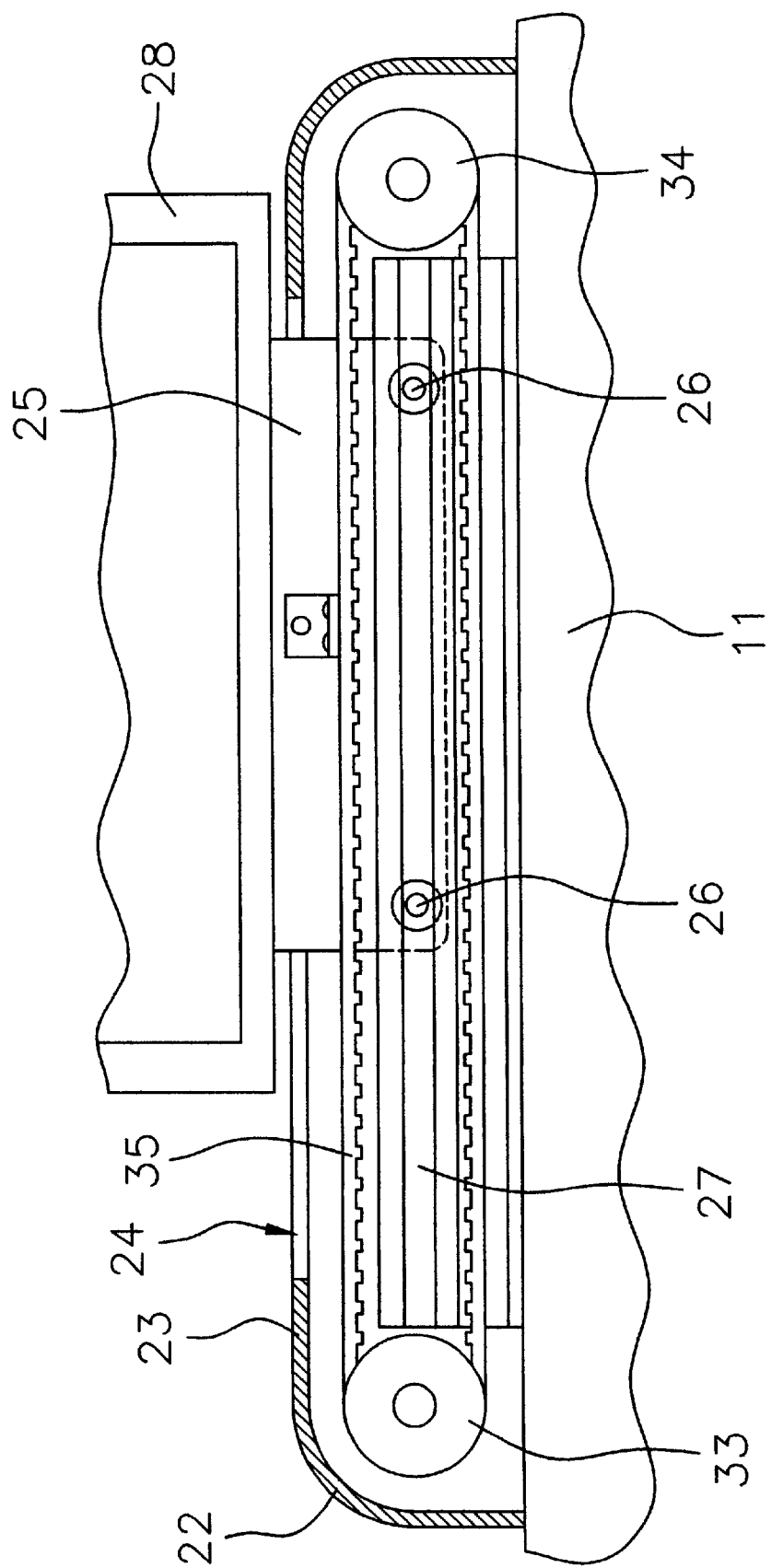
FIG. 3 is a detailed cross-sectional view of the seat movement assembly of the present invention.
Figure 4:
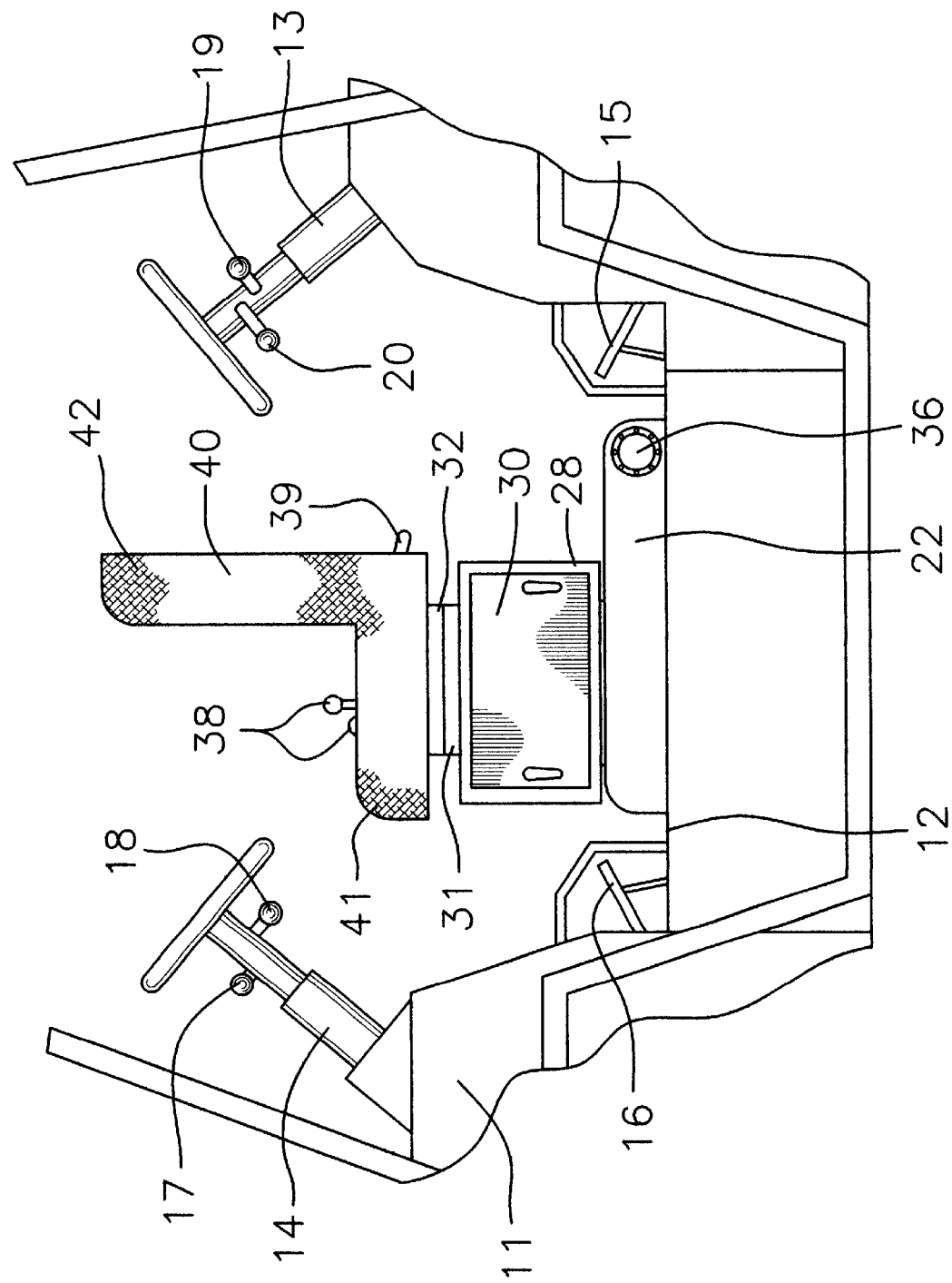
FIG. 4 is a detailed side elevational view of the present invention.

With reference now to the drawings, and in particular to FIGS. 1 through 4 thereof, a new fork lift apparatus embodying the principles and concepts of the present invention and generally designated by the reference numeral 10 will be described.

As best illustrated in FIGS. 1 through 4, the fork lift apparatus 10 generally comprises a conventional fork lift chassis 11 including a frame being conventionally mounted upon a wheel assembly including axle members and wheel members. A conventional drive assembly is conventionally mounted to the conventional fork lift chassis 11 and includes a pair of conventional steering mechanisms 13,14 being functionally positioned at opposite ends of the conventional fork lift chassis 11 and also includes a pair of foot pedals 15,16 being functionally and conventionally positioned at the opposite ends of the conventional fork lift chassis 11 and further includes conventional control levers 17–20 being conventionally mounted to the steering mechanisms 13,14 for driving the fork lift apparatus 10. A conventional lift assembly 21 is movably and conventionally mounted upon one of the ends of the conventional fork lift chassis 11 for lifting objects.

A positionable seat assembly is mounted upon the conventional fork lift chassis 11 for movement between the steering mechanisms 13,14. The positionable seat assembly includes a base housing 22 being securely and conventionally mounted upon a floor 12 of the conventional fork lift chassis 11, and also includes a seat support assembly being movably mounted upon the base housing 22, and further includes a seat movement assembly being disposed in the base housing 22 and being engagable to the seat support assembly, and also includes a seat member 40 being conventionally mounted upon the seat support assembly. The base housing 22 includes a top wall 23 having a longitudinal opening 24 disposed therethrough and also includes a track 27 being conventionally disposed in the base housing 22. The seat support assembly includes a base member 25 being disposed through the longitudinal opening 24 of the base housing 22, and also includes rollers 26 being rotatably and conventionally mounted to the base member 25 and being conventionally disposed upon the track 27 for moving the base member 25 back and forth in the base housing 22, and further includes a container 28 being conventionally mounted upon the base member 25 and having an open side 29 with a cover 30 being removably and conventionally disposed over the open side 29 of the container 28; and also includes first and second plate-like seat support members 31,32 being conventionally mounted upon the container 28 with the second plate-like seat support member 32 being conventionally rotatable relative to the first plate-like seat support member 31. The seat movement assembly includes pulley members 33,34 being spaced apart and being rotatably and conventionally mounted in the base housing 22, and also includes an endless belt 35 being carried about the pulley members 33,34 and being engaged to the base member 25 for movement thereof, and further includes a motor 36 being conventionally disposed in the container 28 and being conventionally connected to one of the pulley members 33,34 for moving the endless belt 35, and also includes batteries 37 being removably and conventionally disposed in the container 28 and being conventionally connected to the motor 36 for the energizing thereof, and further includes lever-like switches 38 being conventionally mounted to the seat member 40 and being conventionally connected to the motor 36 and to the batteries 37 for the energizing thereof, and also includes a latch member 39 being conventionally attached to the seat member 40 for releasing the seat member 40 so that the seat member 40 can conventionally rotate with the second plate-like seat support member 32 upon the first plate-like seat support member 31. The seat member 40 includes a seat cushion 41 which is securely and conventionally mounted upon the second plate-like seat support member 32, and also includes a backrest member 42 being conventionally attached to the seat cushion 41.

In use, when the user wants to move the seat member 40 from one steering mechanism 13,14 to the other, the user would move one of the lever-like switches 38 which energizes the motor 36 which actuates the endless belt 35 which moves the base member 25 in the base housing 22, and the user would move the latch member 39 to swivel the seat member 40 so that the user can face the particular steering mechanism 13,14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the fork lift apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fork lift apparatus comprising:

a fork lift chassis including a frame being mounted upon a wheel assembly including axle members and wheel members;

a drive assembly being mounted to said fork lift chassis and including a pair of steering mechanisms being functionally positioned at opposite ends of said fork lift chassis and also including a pair of foot pedals being functionally positioned at the opposite ends of said fork lift chassis and further including control levers being mounted to said steering mechanisms for driving said fork lift apparatus;

a lift assembly being movably mounted upon one of the ends of said fork lift chassis for lifting objects; and a positionable seat assembly being mounted upon said fork lift chassis for movement between said steering mechanisms, said positionable seat assembly including a base housing being mounted upon a floor of said fork lift chassis, and also including a seat support assembly being movably mounted upon said base housing, and further including a seat movement assembly being disposed in said base housing and being engageable to said seat support assembly, and also including a seat member being mounted upon said seat support assembly, said base housing including a top wall having a longitudinal opening disposed therethrough, and also including a track being disposed inside thereof.

2. A fork lift apparatus as described in claim 1, wherein said seat support assembly includes a base member being disposed through said longitudinal opening of said base housing, and also includes rollers being rotatably mounted to said base member and being disposed upon said track for moving said base member back and forth in said base housing, and further includes a container being mounted upon said base member and having an open side with a cover being removably disposed over said open side of said container; and also includes first and second seat support members being mounted upon said container with said second seat support member being rotatable relative to said first seat support member.

3. A fork lift apparatus as described in claim 2, wherein said seat movement assembly includes pulley members being spaced apart and being rotatably mounted in said base housing, and also includes an endless belt being carried about said pulley members and engaged to said base member for movement thereof, and further includes a motor being disposed in said container and being connected to at least one of said pulley members for moving said endless belt, and also includes at least one battery being removably disposed in said container and being connected to said motor for the energizing thereof, and further includes switches being mounted to said seat member and being connected to said motor and to said at least one battery for the energizing thereof, and also includes latch member being attached to said seat member for releasing said seat member so that said seat member can rotate with said second seat support member upon said first seat support member.

4. A fork lift apparatus as described in claim 3, wherein said seat member includes a seat cushion which is securely mounted upon said second seat support member, and also includes a backrest member being attached to said seat cushion.

* * * * *